J. M. WALL & C. MELDRUM.
TAPER AND ANGLE MEASURING DEVICE.
APPLICATION FILED AUG. 7, 1915.
1,215,443.
Patented Feb. 13, 1917.
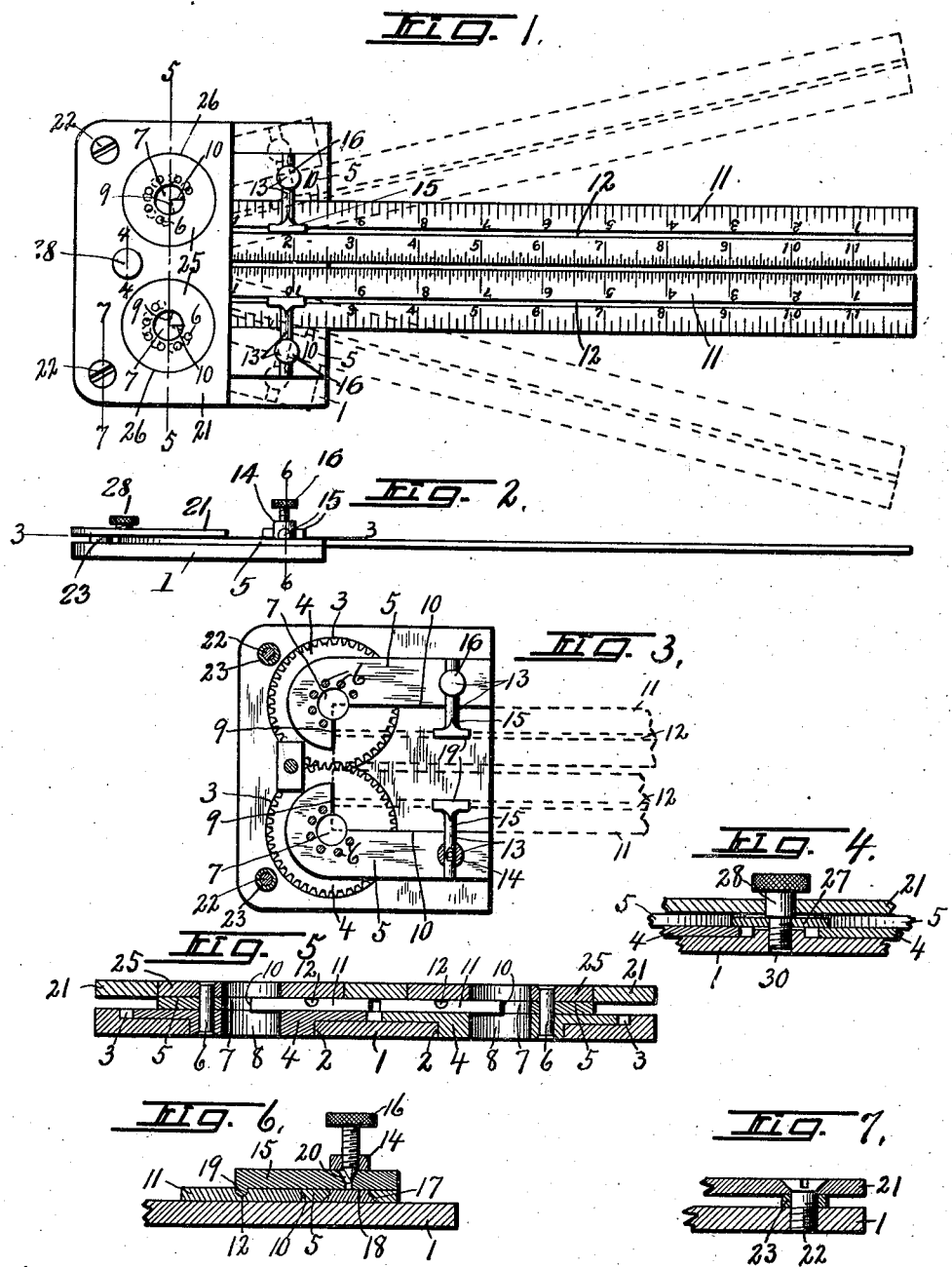

UNITED STATES PATENT OFFICE.

JOHN M. WALL AND CHARLES MELDRUM, OF SYRACUSE, NEW YORK.

TAPER AND ANGLE MEASURING DEVICE.

1,215,443.

Specification of Letters Patent.   Patented Feb. 13, 1917.

Application filed August 7, 1915. Serial No. 44,182.

*To all whom it may concern:*

Be it known that we, JOHN M. WALL and CHARLES MELDRUM, citizens of the United States, and residents of Syracuse, in the county of Onondaga, in the State of New York, have invented new and useful Improvements in Taper and Angle Measuring Devices, of which the following, taken in connection with the accompanying drawings, is a full, clear, and exact description.

This invention relates to certain improvements in taper-and-angle measuring devices for use in machine shops and other places where such a device might be of service, and involves the use of relatively short gear-connected arms movable in the same plane about their respective axes to and from a medial line to form equal angles therewith in any position of adjustment, in combination with separate relatively longer measuring bars removably clamped to their respective arms and having straight edges extending radially from their axes some distance beyond the free ends of the supporting arms and preferably of predetermined unit-of-measurement lengths, as, for example, one foot or twelve inch steel scale bars commonly used in machine shop practice.

One of the objects is to provide a simple, compact and comparatively inexpensive device to which a pair of similar scale bars, usually owned by the mechanic, or which may be purchased at a relatively small cost, may be easily and quickly applied to produce a highly efficient and accurate device for measuring tapers and angles.

Another object of the use of relatively long scale bars of unit length, such as one foot, is to enable the operator to accurately measure the distance across the outer ends of the straight radial edges thereof by means of a micrometer scale to give a more accurate reading in degrees and minutes to be used in connection with a table of sines or cosines, whereby the exact taper or angle as measured by the bars may be more accurately determined.

Other objects and uses relating to specific parts of the device will be brought out in the following description.

In the drawings—

Figures 1 and 2 are respectively a top plan and an edge view of a taper-and-angle measuring device embodying the features of our invention.

Fig. 3 is a horizontal sectional view through the head of said device, taken on line 3—3, Fig. 2.

Figs. 4, 5, 6 and 7 are enlarged vertical sectional views, taken respectively on lines 4—4, 5—5, and 7—7, Fig. 1, and 6—6 Fig. 2.

As illustrated, this device comprises a flat and substantially rectangular base plate —1— having parallel journal openings —2— in spaced relation and circular communicating recesses —3— in its upper face concentric with the respective journal openings —2— for receiving a pair of intermeshing gears —4— having suitable hubs journaled in the openings —2— and their remaining portions of substantially the same vertical depth as the recesses —3—, so that the upper faces of the gears are substantially flush with the corresponding face of the base plate.

Suitable rock arms —5— are rigidly secured by bolts or rivets —6— to the upper flat faces of the gears —4— and are provided with central openings —7— co-axial with similar central openings —8— through the hubs of the gears —4—, said arms being also provided with relatively short radial abutments —9— and relatively longer radial abutments —10— at right angles to the abutments —9—.

These abutments are formed on the inner longitudinal edges of the arms —5— and extend radially from the central openings —7— to form suitable seats for the ends and outer longitudinal edges of a pair of relatively longer bars —11— which in this instance consist of steel rules or scales of standard make, such as commonly used in machine shop practice, and are preferably used in foot or twelve inch lengths, and are provided with lengthwise grooves —12— to permit them to be used as slide scales when desired, said bars being, therefore, rectangular and are secured by clamps —13— to the arms —5— with one end resting against the abutments —9— and adjacent portions of their outer longitudinal edges resting against the abutments —10—, thus bringing the outer longitudinal edges radial to the axes of the gears and also of the arms —5—.

The object of the central openings —7— in the arms —5— is to permit the adjacent corners of the bars —11— to register with the axes of said arms and to avoid the accumulation of foreign matter at said corners which might interfere with the accurate placing of the bars.

The outer edges of the bars —11—, therefore, extend radially from the axes of movement of the arms —5— in all positions of adjustment of said arms, and by gearing the arms together in the manner described it is obvious that when either arm is adjusted horizontally about its axis of movement to any degree or angle from a medial line, the other arm will be automatically adjusted to the same degree.

Each clamp —13— comprises a head —14—, a clamping bar —15—, and a handscrew —16—, the head —14— being provided with a circular dove-tailed base which is journaled in a similarly shaped opening —17— in the corresponding arm —5— to secure the head to said arm and permit it to rotate thereon. The head —14— rises some distance above the upper face of the arm —5— and is provided with an opening —18— in which the shank of the clamping member —15— is adjustable, the lower side of the opening —18— being substantially coincident with the upper face of the arm —5— to permit the member —15— to lie flat thereon.

The inner end of the clamping member —15— is provided with a pendant flange —19— engaging in the groove —12— of the adjacent bar —11— to clamp said bar to the base plate —1— and against the adjacent edge of the arm —5—.

The hand-screw —16— is engaged in a vertical threaded aperture in the head —14— and is provided with a tapered lower end engaging one side of a tapering aperture —20— in the shank of the clamping member —15—, the distance between the center of the aperture —20— and flange —19— being slightly less than the distance between the axis of the head —14— and groove —12— of the bar —11— when the outer edge of the latter is engaged with the abutment —10— of the arm —5—, so that when the screw —16 is tightened its tapering lower end will ride against the outer wall of the tapering socket —20—, thereby tending to draw the clamping member —15— in the same direction to frictionally tighten the outer edge of the bar —11— against the abutment —10— to firmly lock the bar —11—.

A cover-plate —21— is secured by screws —22— or other suitable fastening means to the base plate —1— with interposed spacing sleeves —23— to hold said plates in spaced relation, the object of the cover-plate being to cover and protect the gears —4—, and, in order that the gears —4— and arms —5— may operate with greater precision, the arms are provided with upwardly projecting hubs —25— journaled in openings —26— in the cover-plate —21— and are locked to the arms by the pins —6— so as to rotate therewith.

Suitable means is provided for locking the gears —4— and arms —5— in their adjusted positions, said means consisting in this instance of clamping plate —27— and screw —28—, the plate —27— being interposed between the base plate —1— and cover-plate —21— just at the rear of a direct line drawn between the axes of the gears and midway between said gears, so as to permit its opposite ends to frictionally engage adjacent portions of the gears when the screw —28— is tightened upon the plate.

This screw is provided with a reduced threaded end engaging in a threaded aperture —30— in the base plate —1—, and has a shoulder for engaging the upper face of the clamping plate —27—, the remaining portion of the screw extending through an aperture in the cover-plate —21— and provided with a knurled head by which it may be turned by hand for tightening and loosening the plate —27—.

This instrument is adapted to be used more particularly in machine shop practice for close measurement of tapers and angles of objects, and the purpose in using the relatively long arms or bars —11— of unit length, as one foot, is to render the calculation of the taper or angle more closely accurate by micrometer measurement across the extreme outer ends of the outer edges of the bars, the inner ends of said outer edges being spaced a predetermined distance, in this instance two inches, apart so that in ascertaining the angle or taper from such micrometer measurement, it is necessary to subtract the distance between centers or two inches and to divide the result by two which will give the sine of the angle to which either blade has been adjusted from its normal position.

From this sine, the angle or taper per foot may be readily ascertained from standard tables of sines and angles, but in order that this instrument may be used expeditiously in shop practice, it is accompanied by a special table of sines and corresponding angles in degrees and minutes from zero to forty-five, giving the measurements corresponding to such sines and angles opposite each, so that the user after taking the micrometer measurement in the manner described may refer to the table and find a similar measurement and the sine or angle corresponding thereto.

It is proposed to use this device in connection with a previously prepared table of angles and their corresponding sines or correlated ratios computed in degrees and minutes or taper per foot radius, so that, being given the micrometer measurement across the ends of the outer edges of the scale bars, the exact angle in degrees and minutes or taper per foot may be found upon the table opposite the sine corresponding to such measurement.

What we claim is:—

1. In a taper-and-angle measuring device, the combination of two gear-connected arms movable about the axes of their respective gears and provided with radial abutments leading from said axes at right angles to each other, rectangular elongated bars seated edgewise and endwise against said abutments, and clamping devices on the arms for locking the bars thereto to turn therewith.

2. In a taper-and-angle measuring device, the combination of a base plate, a pair of intermeshing gears journaled thereon, coöperative arms secured to the gears and provided with radial abutments at right angles to each other, rectangular bars seated endwise and edgewise against said abutments and extending some distance beyond the free ends of the arms, and separate devices for clamping the bars to the arms.

3. In a taper-and-angle measuring device, the combination of a pair of gear-connected arms, bars mounted on the arms and each having a straight edge extending radially from the axis of its supporting arm, and separate devices for clamping the bars to the arms.

4. In a taper-and-angle measuring device, the combination of a pair of gear-connected arms, bars mounted on the arms and each having a straight edge extending radially from the axis of its supporting arm, separate devices for clamping the bars to the arms, and means for locking the gears against rotation.

5. In a taper-and-angle measuring device, the combination of a base plate, intermeshing gears journaled thereon, arms secured to the gears and provided with central holes coaxial with their gears, each arm having radial abutments leading from the holes at right angles to each other, separate bars seated edgewise and endwise against said abutments and having straight edges and lengthwise grooves, separate clamping devices on the arms engaging in said grooves for locking the bars to said arms, and means for locking the gears in their adjusted positions.

6. In a measuring device of the character described, the combination of a support, an arm pivoted thereto and provided with an opening coaxial with its axis of movement, said arm having straight edges leading from said opening at right angles to each other, a straight scale bar having one edge abutting against one edge of the arm and its other end abutting against the other edge of said arm, and means for clamping the scale bar to the arm to swing therewith.

7. In a measuring device of the character described, the combination of a support, an arm pivoted thereto and provided with straight edges at right angles to each other and radial to the axis of movement of the arm, a scale bar having one edge seated against one edge of the arm and one end seated against the other edge of said arm, and means for clamping the bar to the arm to swing therewith.

8. In a measuring device of the character described, the combination of a support, a pair of gear-connected arms pivotally mounted thereon side by side to swing in the same plane, and a pair of straight scale bars mounted on said arms to swing therewith and having their outer longitudinal edges extending radially to the axes of movement of their respective arms.

In witness whereof we have hereunto set our hands this 24th day of July, 1915.

JOHN M. WALL.
CHARLES MELDRUM.

Witnesses:
H. E. CHASE,
M. VIOLA HOWLAND.

Copies of this patent may be obtained for five cents each, by addressing the "Commissioner of Patents, Washington, D. C."